2,880,251
Patented Mar. 31, 1959

2,880,251

DEALKYLATION OF ALKYL NAPHTHALENES IN THE PRESENCE OF ORGANO-ALUMINUM CATALYST

James L. Jezl, Swarthmore, and Archibald P. Stuart, Media, Pa., assignors to Sun Oil Company, Philadelphia, Pa., a corporation of New Jersey No Drawing. Application November 22, 1957
Serial No. 698,035

6 Claims. (Cl. 260—672)

This invention relates to a process for dealkylating alkyl naphthalenes, and more particularly to a process for conducting the dealkylations at moderate temperatures, whereby to avoid losses from cracking reactions.

In the past considerable interest has been displayed in the production of naphthalene from alkyl naphthalenes, which occur in abundance in the 400–550° F. fraction of cracked petroleum. The only processes developed to date which appear to be of any commercial significance involve the reaction of hydrogen with alkyl naphthalenes at high temperatures to yield naphthalene and paraffins, either noncatalytically, or in the presence of various catalysts, such as iron oxide promoted by chromia and potassium carbonate, nickel oxide promoted by chromia, cobalt molybdate on alumina, silica-alumina, and others. Typical of a noncatalytic process is that disclosed in United States Patent No. 2,674,635 to Beckberger, which teaches reacting methyl naphthalene with hydrogen at a temperature of from 1300° to 2500° F. A typical catalytic process is shown in United States Patent No. 2,653,176 to Beckberger, which discloses reacting hydrogen with methyl naphthalene in the presence of a chromia and potassium carbonate-promoted iron oxide catalyst at a temperature of from 1200° F. to 1800° F.

The chief drawback of these prior art processes is that the reaction temperature is so high that extensive thermal cracking of the feed takes place, with the result that the ultimate yield of naphthalene is on the order of 65% or less of theory, based on the alkyl naphthalene content of the feed. In addition, frequent shutdowns are required to permit cleaning of carbon deposits from the surfaces of the reaction vessels.

We have now found that hydrogen may be reacted with alkylated naphthalenes at temperatures in the range of 200° to 350° C. in the presence of an aluminum alkyl, aluminum alkyl hydride or aluminum hydride catalyst, at hydrogen pressures in excess of 100 p.s.i.g. As the pressure is increased, the speed of the reaction will increase, but pressures above about 10,000 p.s.i. are not preferred, since the cost of equipment necessary to contain these pressures impose a heavy economic penalty on the process. Preferably, the pressure will be from about 1000 p.s.i.g. to about 5000 p.s.i.g. since at pressures below about 1000 p.s.i.g. the reaction proceeds so slowly as to be economically unattractive. There is, however, no limit to the pressure which may be used, provided equipment capable of withstanding the pressure is available. Catalysts suitable for use in our new process include aluminum trimethyl, aluminum triethyl, aluminum triisobutyl, dimethyl aluminum hydride, diethyl aluminum hydride, methyl aluminum dihydride, ethyl aluminum dihydride and aluminum hydride, but any other aluminum compound having the generic formula AlRR'R" in which R, R' or R" is hydrogen or an alkyl radical having from one to five carbon atoms may be used. Of these, aluminum triethyl is preferred, since it is sufficiently stable at temperatures in the vicinity of 350° C. and the naphthalene product can be readily separated from unreacted feed and the catalyst. In general, the catalyst should be present in the amount of from 0.1 weight percent to 5 weight percent of the reaction mixture. Higher percentages may be used, but the use of more than 5% is not economically attractive. With the use of these catalysts under these conditions the only reaction which takes place is the dealkylation reaction, and there are no losses to cracking or other reactions, so that an ultimate yield of naphthalene approaching 100% of theory may be obtained.

In proceeding in accordance with our invention, an alkylated naphthalene feed stock is charged to a pressure reactor which has been previously flushed with nitrogen in order to exclude oxygen. The catalyst is then added, and the reactor is sealed and pressured with hydrogen to the desired pressure. The reactor is then heated to reaction temperature, and is kept at this temperature, while stirring the reactor contents, until the desired degree of conversion has been had. When the catalyst is aluminum triethyl or diethyl aluminum hydride or a higher aluminum alkyl or hydride, we prefer to terminate the reaction when only a minor portion of the feed has been converted, and to distill off the naphthalene product, since by proceeding in this manner the catalyst may be preserved in an active state for further conversions. While the boiling point of pure aluminum triethyl has been variously reported as 194° C. and 207° C., we have found that aluminum triethyl in solution in a hydrocarbon solvent is in some way associated so that during distillation it will largely remain in the solvent at temperatures as high as 250° C., thus permitting separation of product naphthalene by distillation. When aluminum trimethyl is used as the catalyst, in order to facilitate economical recovery of catalyst we prefer to allow the reaction to go to completion as far as possible, since the catalyst cannot be separated from the product naphthalene by distillation, and it is necessary to recover the naphthalene product by crystallization in order to recover the catalyst for re-use.

In order that those skilled in the art may more fully understand the nature of our invention and a method for carrying it out, the following specific example is given.

Example I

Fifty-six grams of beta methyl naphthalene were charged to a bomb of 310 ml. capacity which had been previously freed of oxygen, and 0.57 gram of aluminum triethyl in solution in 5 ml. of heptane was added. The bomb was then sealed, and was pressured with hydrogen to 980 p.s.i.g. at 30° C. The temperature was then raised to 250° C., the pressure in the bomb at this temperature being 1700 p.s.i.g. The bomb was held at this temperature for 3.5 hours, after which it was cooled and depressured. Analysis of the contents of the bomb showed that 15% of the charge had been converted to naphthalene, and 10% had been isomerized to alpha methyl naphthalene, while the balance of the feed was unchanged. No reaction products other than naphthalene and methane resulting from demethylation could be detected, indicating that an ultimate conversion of essentially 100% of theory is possible by proceeding in accordance with the invention.

The process may be operated with other catalysts and under other conditions to yield substantially the same results. Thus good results may be obtained with aluminum triisobutyl catalyst at 200° C. and 2000 p.s.i.g. initial hydrogen pressure, and with aluminum trimethyl at 325° C. and 500 p.s.i.g. initial hydrogen pressure. While the specific example shows the dealkylation of beta methyl naphthalene, other alkylated naphthalenes such as polymethyl naphthalenes or ethyl naphthalenes will behave in a similar manner.

The invention claimed is:

1. A process for the manufacture of naphthalene which comprises contacting a feed stock comprising alkylated naphthalenes with hydrogen at a pressure in excess of 100 p.s.i.g. and at a temperature within the range of 200° C. to 350° C., in the presence of from about 0.1 weight percent to about 5 weight percent of a catalytic compound having the generic formula AlRR'R'' in which R, R' and R'' are selected from the group consisting of hydrogen and hydrocarbon radicals having from 1 to 5 carbon atoms, for a period of time sufficient to convert at least a part of the feed stock to naphthalene, and recovering naphthalene from the conversion products.

2. The process according to claim 1 in which the catalytic compound is aluminum triethyl.

3. The process according to claim 1 in which the catalytic compound is aluminum trimethyl.

4. The process according to claim 1 in which the catalytic compound is aluminum triisobutyl.

5. The process according to claim 1 in which the catalytic compound is aluminum hydride.

6. The process according to claim 1 in which the catalytic compound is diethyl aluminum hydride.

References Cited in the file of this patent

Grosse et al.: Journal of Organic Chemistry, vol. 5, 1940, page 106 only.